US005483134A

United States Patent [19]
Frazier et al.

[11] Patent Number: 5,483,134
[45] Date of Patent: Jan. 9, 1996

[54] RIBBON SENSING DEVICE FOR BAG TYER

[75] Inventors: Jimmy R. Frazier, Norman; John D. Richardson, Oklahoma City; Greg P. Coxsey, Norman, all of Okla.

[73] Assignee: Burford Corporation, Maysville, Okla.

[21] Appl. No.: 129,284

[22] Filed: Sep. 30, 1993

[51] Int. Cl.[6] .................................................. G05B 5/00
[52] U.S. Cl. ........................ 318/468; 318/626; 318/640; 53/138.8; 53/583
[58] Field of Search ............... 53/138.1–138.3, 53/138.6–138.7, 138.8, 139.4, 583, 203; 318/560, 561, 567, 568.1, 569, 626, 445, 449–450, 466–470

[56] References Cited

U.S. PATENT DOCUMENTS

| | | |
|---|---|---|
| 3,059,670 | 10/1962 | Burford et al. |
| 3,138,904 | 6/1964 | Burford |
| 3,919,829 | 11/1975 | Burford et al. ............... 53/135 |
| 4,277,731 | 7/1981 | Pongracz ..................... 318/562 X |
| 4,856,258 | 8/1989 | Burford et al. ............... 53/138 A |

Primary Examiner—David S. Martin
Attorney, Agent, or Firm—Crutsinger, Booth & Kanz

[57] ABSTRACT

A bag neck tying device for tying a ribbon dispensed from a spool about a gathered neck. A pulley and proximity switch are mounted to prevent the completion of a tying cycle if a bag neck is not properly gathered and ready to be tied.

10 Claims, 13 Drawing Sheets

5,483,134

RIBBON SENSING DEVICE FOR BAG TYER

TECHNICAL FIELD

The invention relates to apparatus for wrapping a ribbon around the gathered neck of a bag and twisting the ribbon for closing and sealing the neck of a flexible bag.

BACKGROUND OF INVENTION

U.S. Pat. No. 3,138,904 to Earl E. Burford entitled "METHOD AND APPARATUS FOR TYING PACKAGES AND WRAPPING MATERIALS;" U.S. Pat. No. 3,059,670 to Charles E. Burford and Leonard W. Burford entitled "WIRE TWISTING TOOL;" U.S. Pat. No. 3,919,829 to Leonard W. Burford and Charles C. Burford entitled "APPARATUS FOR TYING PACKAGES AND WRAPPING MATERIALS;" and U.S. Pat. No. 4,856,258, which issued Aug. 15, 1989 to Charles E. Burford and Jimmy R. Frazier entitled "WIRE TYING DEVICE" disclose apparatus used for closing a plastic bag by attaching and twisting a wire-like ribbon about the neck of the bag.

Bag tying devices of the type disclosed in the aforementioned patents are commercially available from Burford Corporation of Maysville, Okla. The tying devices are generally constructed to receive packages such as loaves of bread at speeds of for example one hundred (100) packages per minute. The design of the bag tying devices requires careful consideration of the mass, acceleration, deceleration and momentum of the moving parts of the tying device. Further, precise synchronization of parts in subassemblies of the tying devices must be maintained throughout a tying cycle if the device is to operate effectively.

SUMMARY OF INVENTION

The bag neck tying device disclosed herein incorporates a bag neck gathering mechanism comprising motor driven gathering belts for moving a bag neck along a path in a plane into engagement with a bag stop controlled by an electric brake positioned adjacent a ribbon holder-shear assembly which holds the free end of a ribbon of tie material. A motor driven needle wraps the strand of tie material around the gathered neck of the bag, and a motor driven twister hook assembly engages the free end and the running end of the ribbon adjacent the gathered neck for twisting the ribbon.

Independently controlled bi-directional, brush type servomotors are mounted in the separate :subassemblies of the tying device. Each of the servomotors is controlled by a solid state DC motor controller in a closed loop feedback system under the control of a multi-channel microcontroller which precisely starts, controls and stops each of the servomotors in a pre-assigned sequence for each cycle of the tying apparatus.

The weight and number of moving parts in the tying device have been significantly reduced. More particularly, the software driven motor controllers isolate the movement of the various components of the tying device to reduce stress and shock loading of parts of mechanical drive trains.

A preferred embodiment of the apparatus for securing material includes improvements in apparatus for gathering material, such as plastic bag material or a variety of other materials such as coils of electrical cord, water hose, tubing, yarn, and bundles of cable, rods, or carrots, and in apparatus for fastening the gathered material. It is contemplated that the disclosed closed loop control circuit may be used to control electric motors to drive apparatus for fastening gathered materials in addition to the specific disclosed embodiment of the bag neck tying device.

DESCRIPTION OF THE DRAWINGS

Drawings of a preferred embodiment of the invention are annexed hereto so that the invention may be better and more fully understood, in which.

Numeral references are employed to designate like parts throughout the various Figures of the drawing.

DESCRIPTION OF A PREFERRED EMBODIMENT

Figure 1:
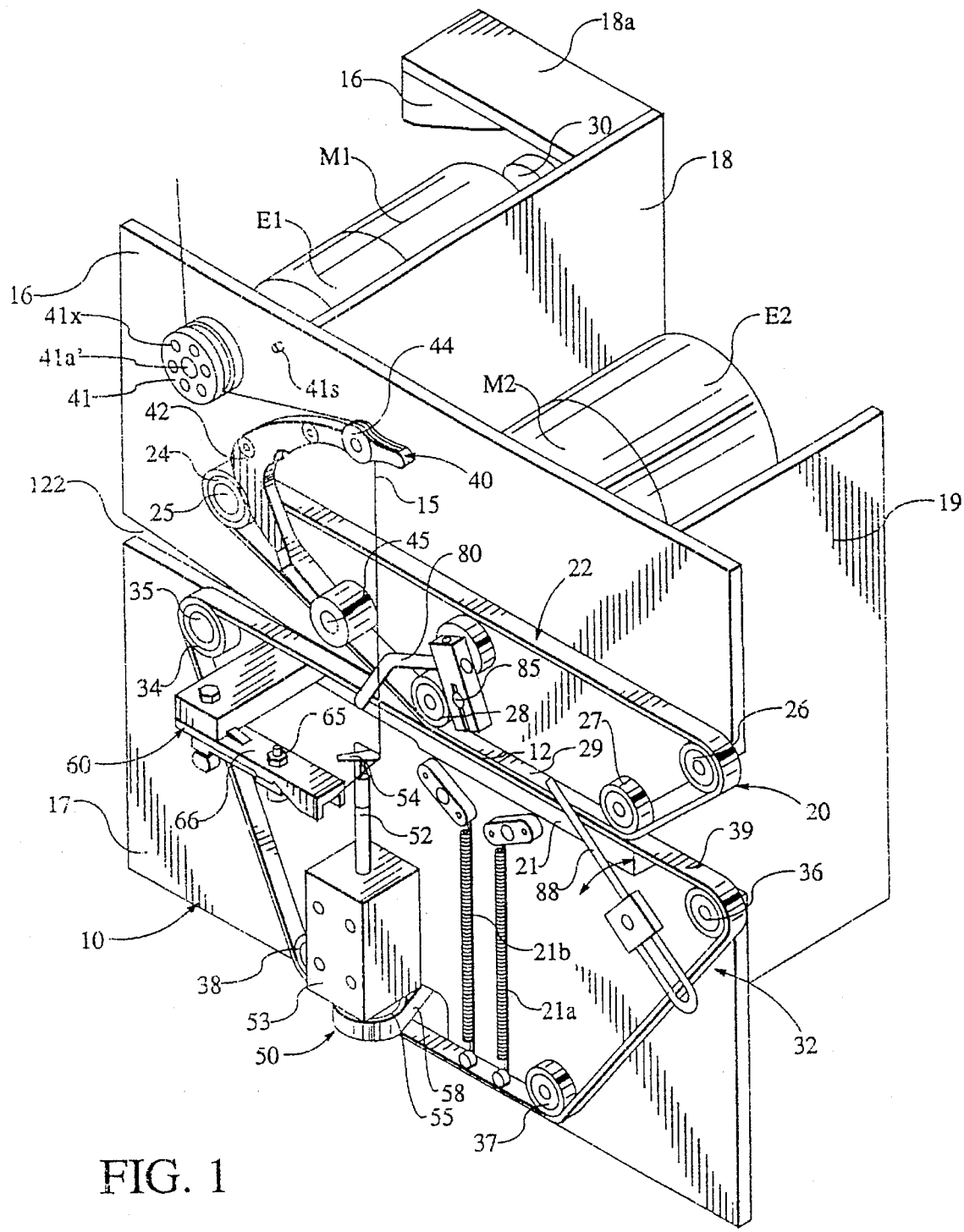
FIG. 1 is a perspective view illustrating the front of the bag neck tying device.
Figure 2:
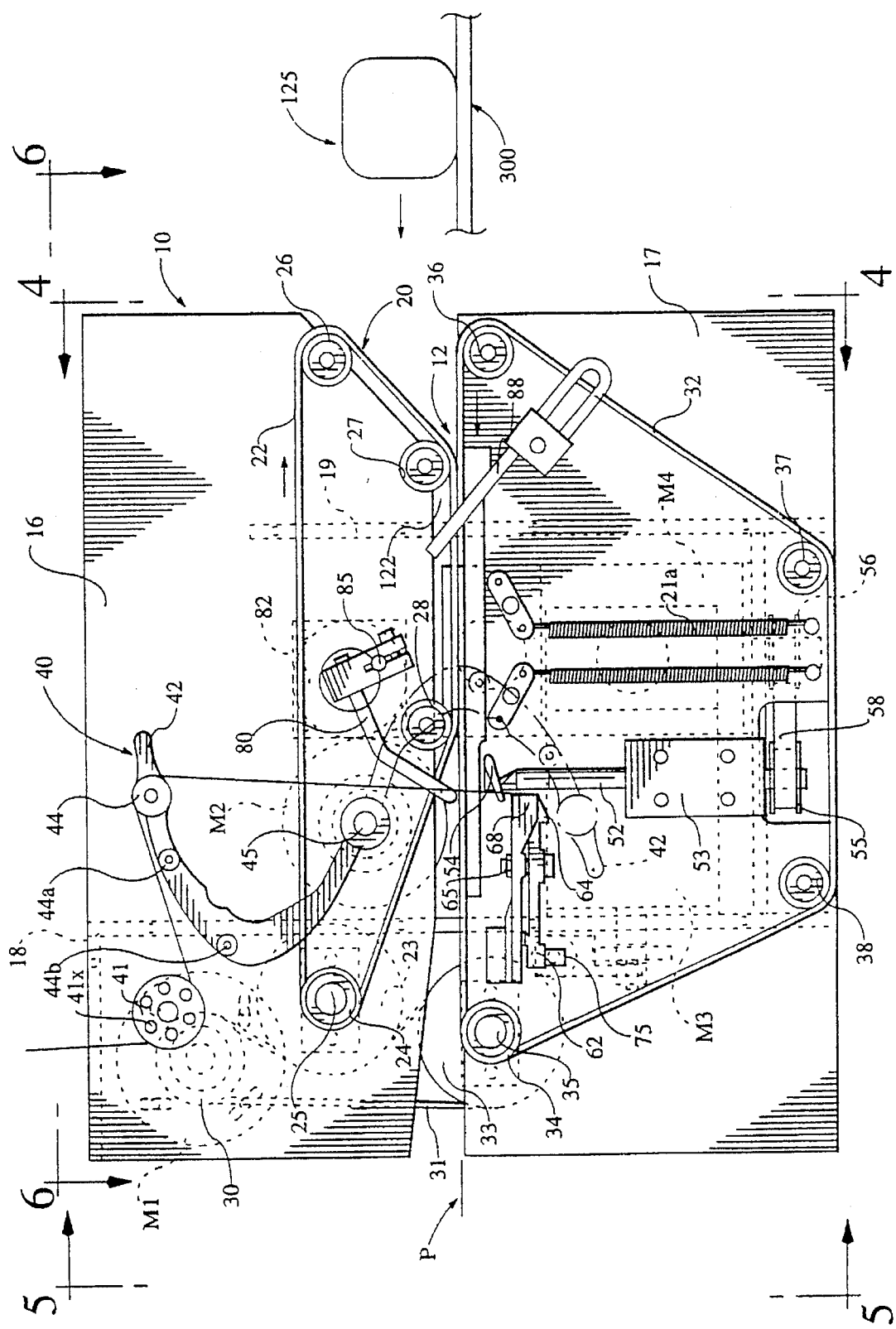
FIG. 2 is a diagrammatic front elevational view.

The wire tying device, generally designated by the numeral 10, in FIGS. 1 and 2 of the drawing is mounted adjacent the side of a conveyor 300 of the type disclosed in Burford U.S. Pat. No. 3,138,904 and Burford U.S. Pat. No. 3,919,829, the disclosures of which are incorporated herein by reference in their entirety for all purposes. Conveyor 300 carries for example, loaves 125 of bread to, through and out of wire tying device 10 in rapid succession. Conveyor 300 is well known to persons skilled in the art and further description thereof is not deemed necessary except in connection with the drive mechanism as will be hereinafter more fully explained. It should be appreciated that other and further structures may form the conveyor.

Figure 12:
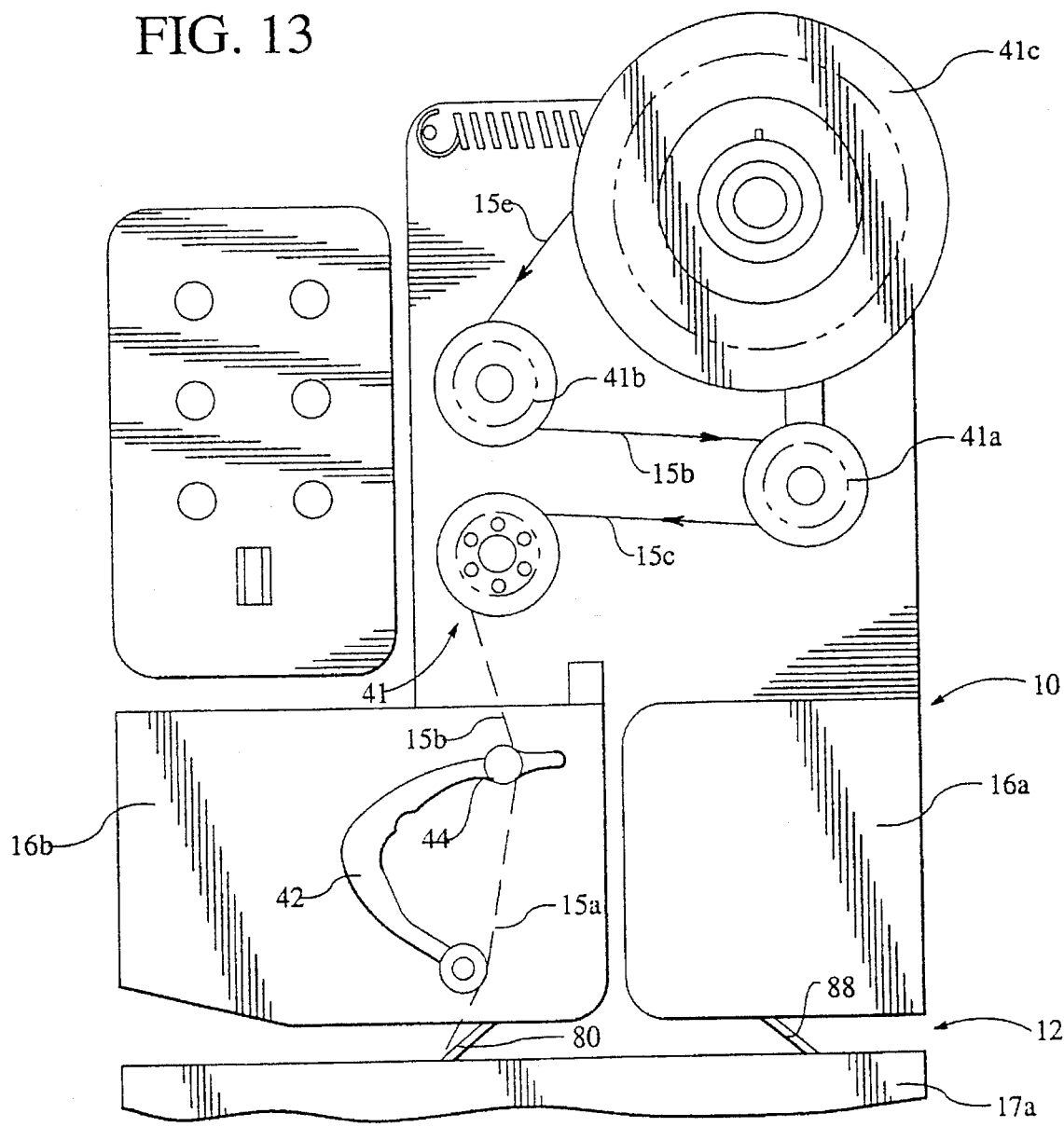
FIG. 12 is a diafframatic front elevational view of the tying device with belt guards and covers in position, illustrating a spool of ribbon.

Referring to Figure I of the drawing, the numeral 20 generally designates a bag gathering apparatus for moving a bag 125 along a path 12 to a position adjacent a needle assembly 40, a twister hook assembly 50 and a holder-shear assembly 60. As will be hereinafter more fully explained, the free end of a ribbon of wire-like material 15 is gripped in holder-shear assembly 60. The neck of the bag moves through a slot 122 between upper face plate 16 and lower face plate 17 for drawing the bag 125 to a controlled tension about the contents thereof. Needle assembly 40 wraps the ribbon 15 of the wire-like material about the gathered neck of the bag and twister hook 50 is actuated for twisting a portion of the wire-like material about the neck of the bag 125. It should be noted that the ribbon of material 15 may be constructed of wire enclosed in paper or plastic or it may comprise a ribbon of plastic or any other material. The strand of ribbon 15 extends around one or more pulleys 41, 41a and 41b mounted on shafts 41a' from a spool 41c of tie material, as best illustrated in FIG. 12.

Figure 14:
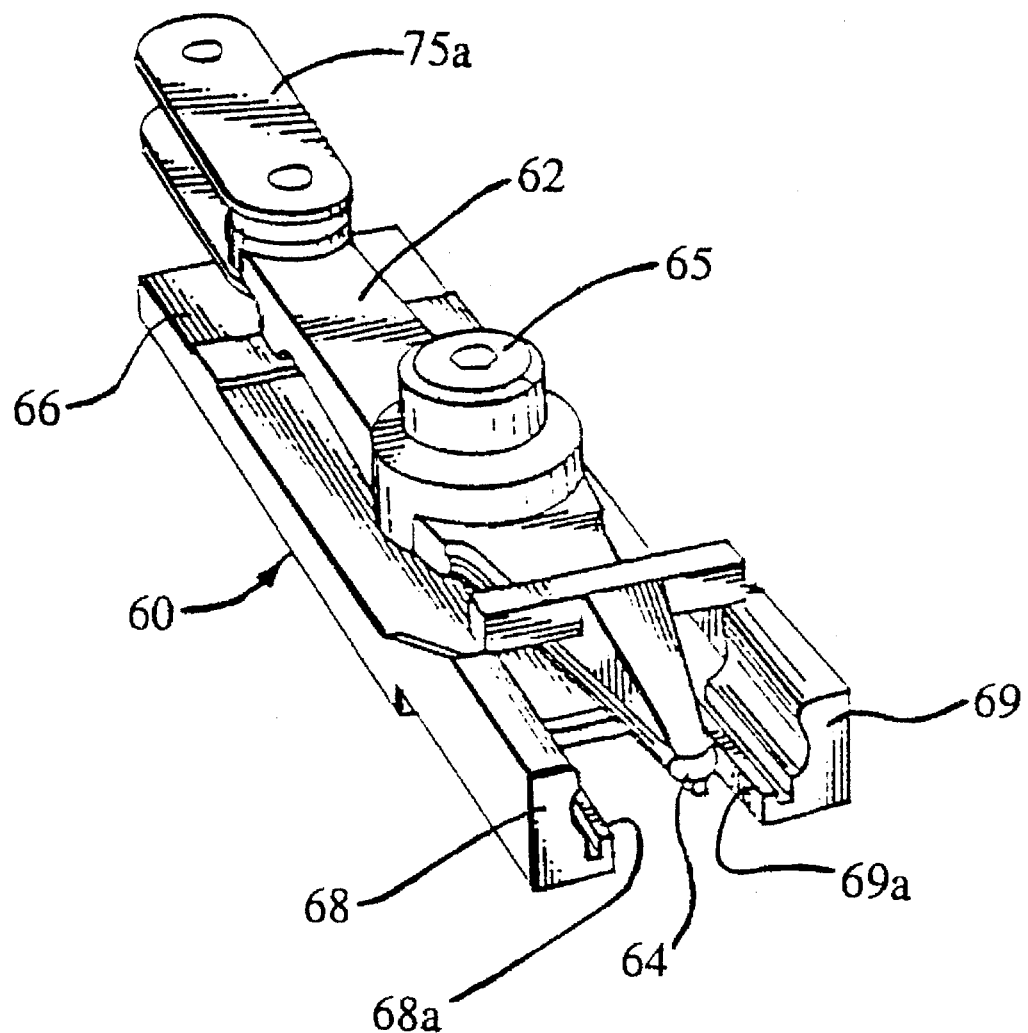
FIG. 14 is a perspective view of a holder-shear assembly.

The mounting for spool 41c is similar to that disclosed in U.S. Pat. No. 3,919,829 entitled "APPARATUS FOR TYING PACKAGES AND WRAPPING MATERIALS", the disclosure of which is incorporated herein by reference in its entirety for all purposes. However, it will be noted that spool 41c of tie material is mounted on a shaft and tie material 15 is fed from spool 14c and is routed around rollers 41b, 41a and 41, around needle roller 44 and the end of the ribbon 15 is gripped in the holder-shear assembly 60, as best illustrated in FIGS. 1 and 14 of the drawing. Spool 41c is mounted on a shaft engaged by a brake (not shown). As needle 42 forms a loop of tie material around the gathered neck of a bag, the force of inertia and force exerted by the brake cause the spool 41c to remain stationary momentarily as a crank arm, on which roller 41a is mounted, is rotated in a clockwise direction as illustrated in FIG. 12 of the drawing.

As will be herein;after more fully explained, one of the pulleys 41, 41a or 41b is preferably equipped with a sensor device which is capable of calculating the amount of ribbon 15 dispensed from spool 41c. The sensor apparatus determines whether or not a bag neck is present. As needle 41 moves from the full outline position illustrated in FIG. 2 to the dashed outline position, if a bag neck is not positioned in the path of the ribbon, the cycle of operation will be interrupted so that the holder-shear assembly 60 will not be actuated and the twister hook assembly 50 will not rotate. This prevents actuation of the holder-shear assembly which would have resulted in the ribbon being dropped or released if a bag neck was not present.

The frame of the bag tying device may assume many configurations. In the illustrated embodiment upper and lower face plates 16 and 17 are supported on forward edges of vertically extending end plates 18 and 19 having slots formed therein to permit passage of a bag neck. A horizontal mounting plate 19a extends between lower portions of end plates 18 and 19 and a vertical mounting plate 16a extends outwardly from end plate 18.

A motor M1, having an encoder E1 mounted the rear end of motor M1, is mounted on an upper portion of the vertical mounting plate 16a for driving the gathering assembly 20. A motor M2, having an encoder E2 mounted the rear end and a gear box 46 mounted on the front end of motor M2, is mounted on an upper portion of the rear surface of face plate 16 for driving the needle assembly 40. A motor M3, having an encoder E3 mounted the rear end of motor M3, is mounted vertically on horizontally extending mounting plate 19a for driving the twister hook assembly 50. A motor M4, having an encoder E4 mounted the rear end of motor M4, is mounted on a lower portion of end plate 18, and in the illustrated embodiment extends below motor M2, for driving the holder-shear assembly 60.

Referring to FIGS. 1–5 of the drawing, bag neck gathering apparatus 20 comprises, in a preferred embodiment of the invention, an upper gathering belt 22 routed around a driven pulley 24 and idler pulleys 26, 27 and 28. The bag neck gathering mechanism 20 further comprises a lower gathering belt 32 routed around a driven pulley 34 and idler pulleys 36, 37 and 38. As best illustrated in FIG. 1 of the drawing, the portion 29 of the upper gathering belt 22, extending between idler pulleys 27 and 2.8, is substantially parallel and closely spaced relative to the portion 39 of the lower gathering belt 32 which extends between driven pulley 34 and idler pulley 36. In the illustrated embodiment, gathering belts 22 and 32 move a bag neck along path 12 in a plane P as illustrated in FIG. 2. A pressure pad 21, resiliently urged upwardly by springs 21a and 21b acting through bell cranks, maintains belts 22 and 32 in frictional engagement with the neck of a bag or other material to be tied.

Figure 3:
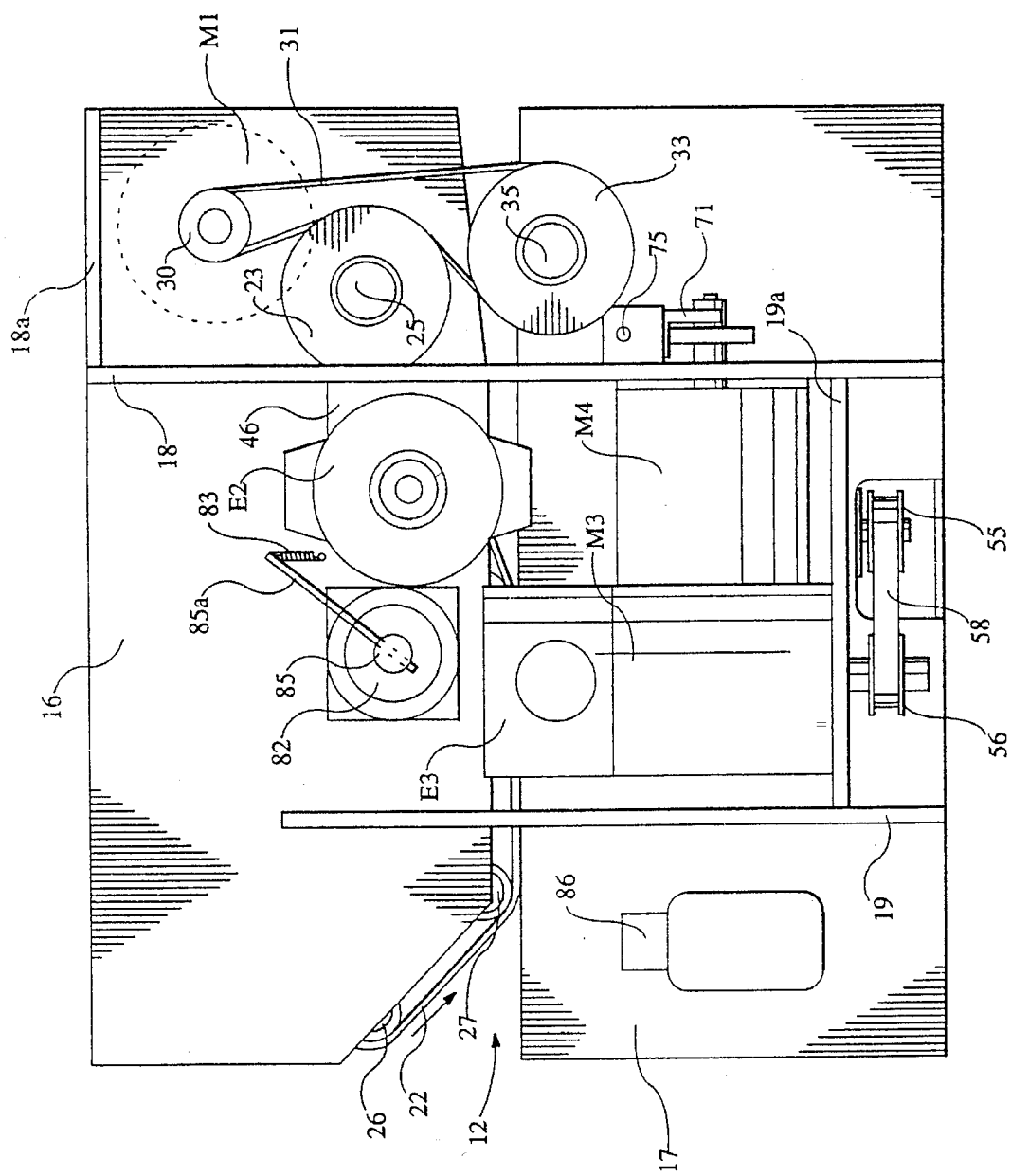
FIG. 3 is a diagrammatic rear elevational view.
Figure 4:
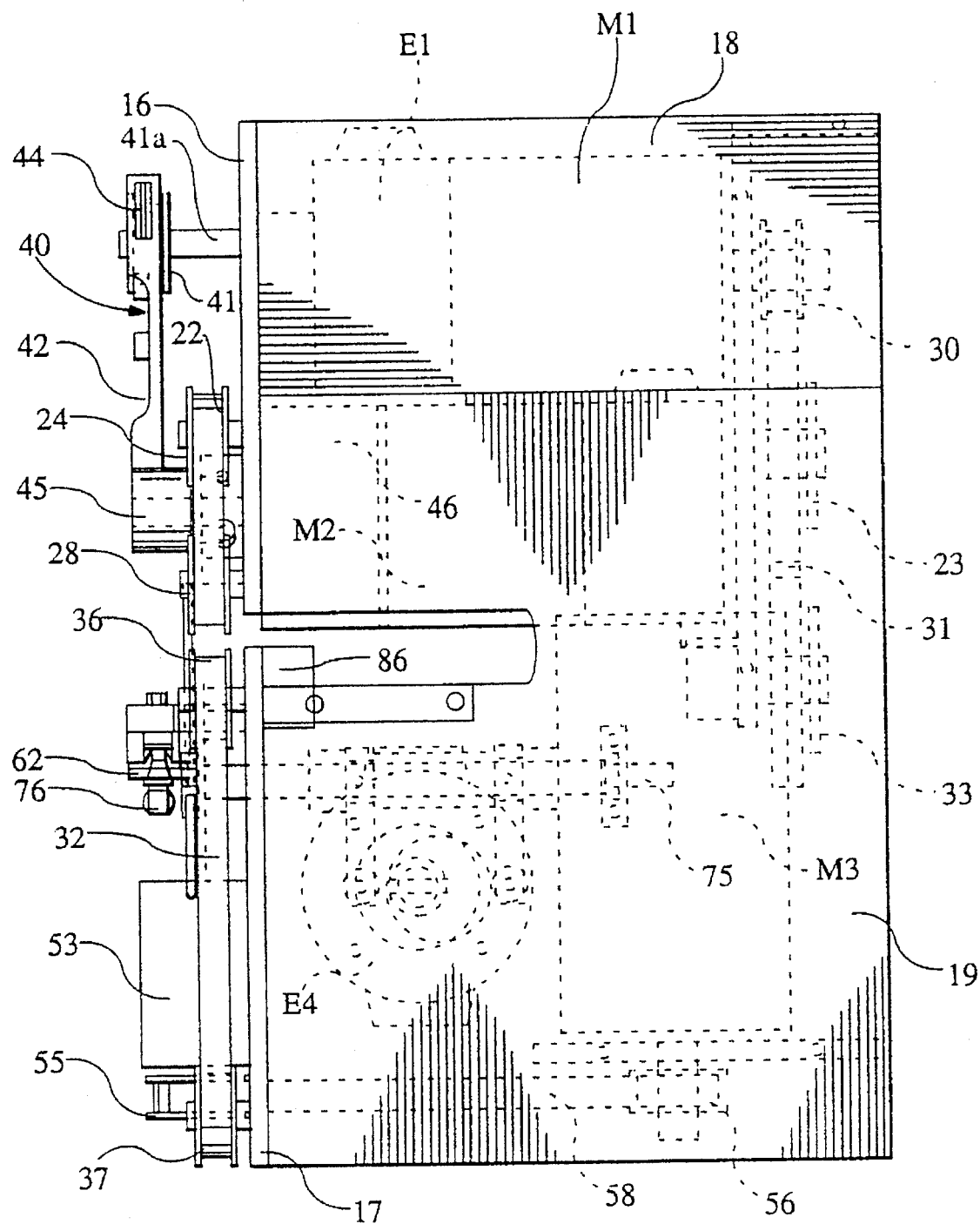
FIG. 4 is an end view looking generally in the direction of the arrows along line 4—4 in FIG. 2.
Figure 5:
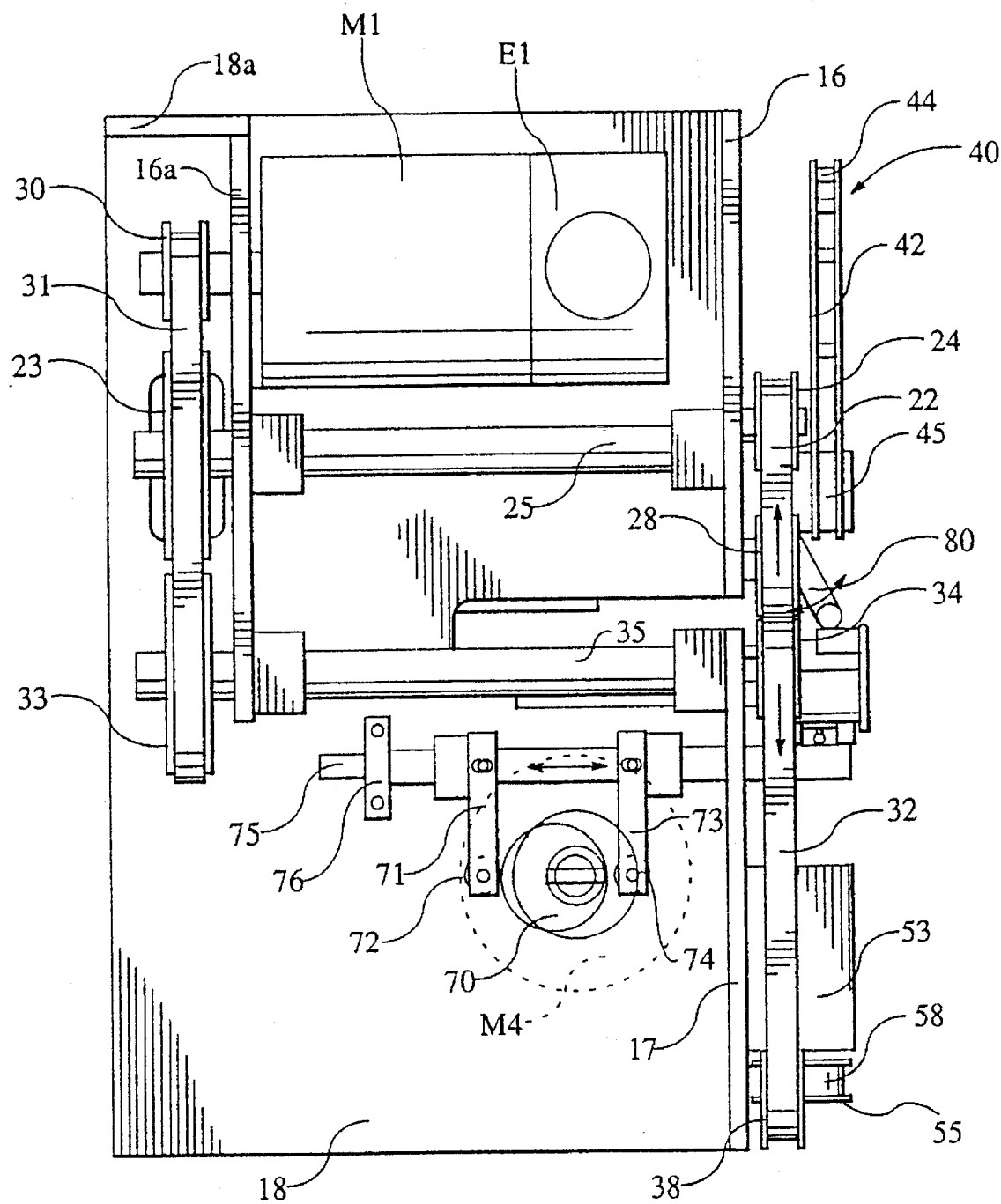
FIG. 5 is a diagrammatic end view illustrating the discharge end of the bag neck tying device, looking in the direction of the arrows along line 5—5 in FIG. 2.
Figure 6:
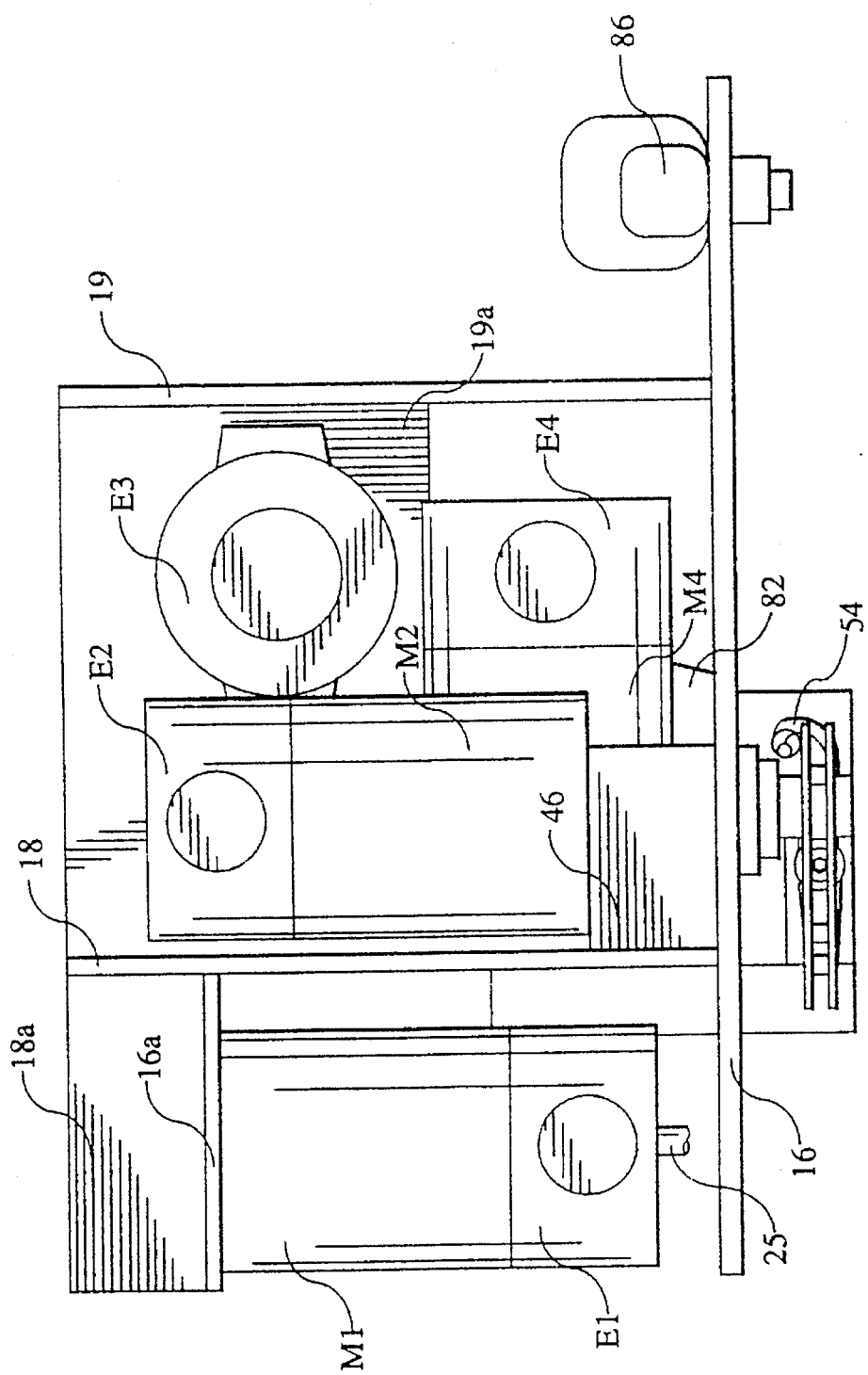
FIG. 6 is a top plan view, looking in the direction of the arrows along line 6—6 in FIG. 2, parts being broken away to more clearly illustrate the details of construction.

As best illustrated in FIGS. 3 and 5 of the drawing, driven shaft 25, having driven pulley 24 mounted on one end, has a pulley 23 mounted on its opposite end. Driven shaft 35, having driven pulley 34 mounted on one end, has a pulley 33 mounted on its opposite end. A pulley 30 mounted on the drive shaft of motor M1 drives pulleys 23 and 33 through a belt 31 such that driven pulley 24 rotates in a clockwise direction while driven pulley 34 rotates in a counter-clockwise direction, as viewed in FIG. 2 of the drawing. Belt guards 16a and 16b and 17a preferably extend between the gathering belts and products on the conveyor, as illustrated in FIG. 12. The bag neck is moved into a slot in the belt guard by brushes (not shown) and the product in the bag engages the belt guards when the neck of the bag is drawn by gathering belts 22 and 32 around a bag stop lever 80. It should be appreciated that other and further gathering structures may be used to form a gathered neck on a bag.

Terms such as "left," "right," "clockwise," "counter-clockwise," "horizontal," "vertical," "up," and "down." when used in reference to the drawings, generally refer to orientation of the parks in the illustrated embodiment and not necessarily during use. These terms used herein are meant only to refer to relative positions and/or orientations, for convenience, and are not to be understood to be in any manner otherwise limiting.

Figure 7:
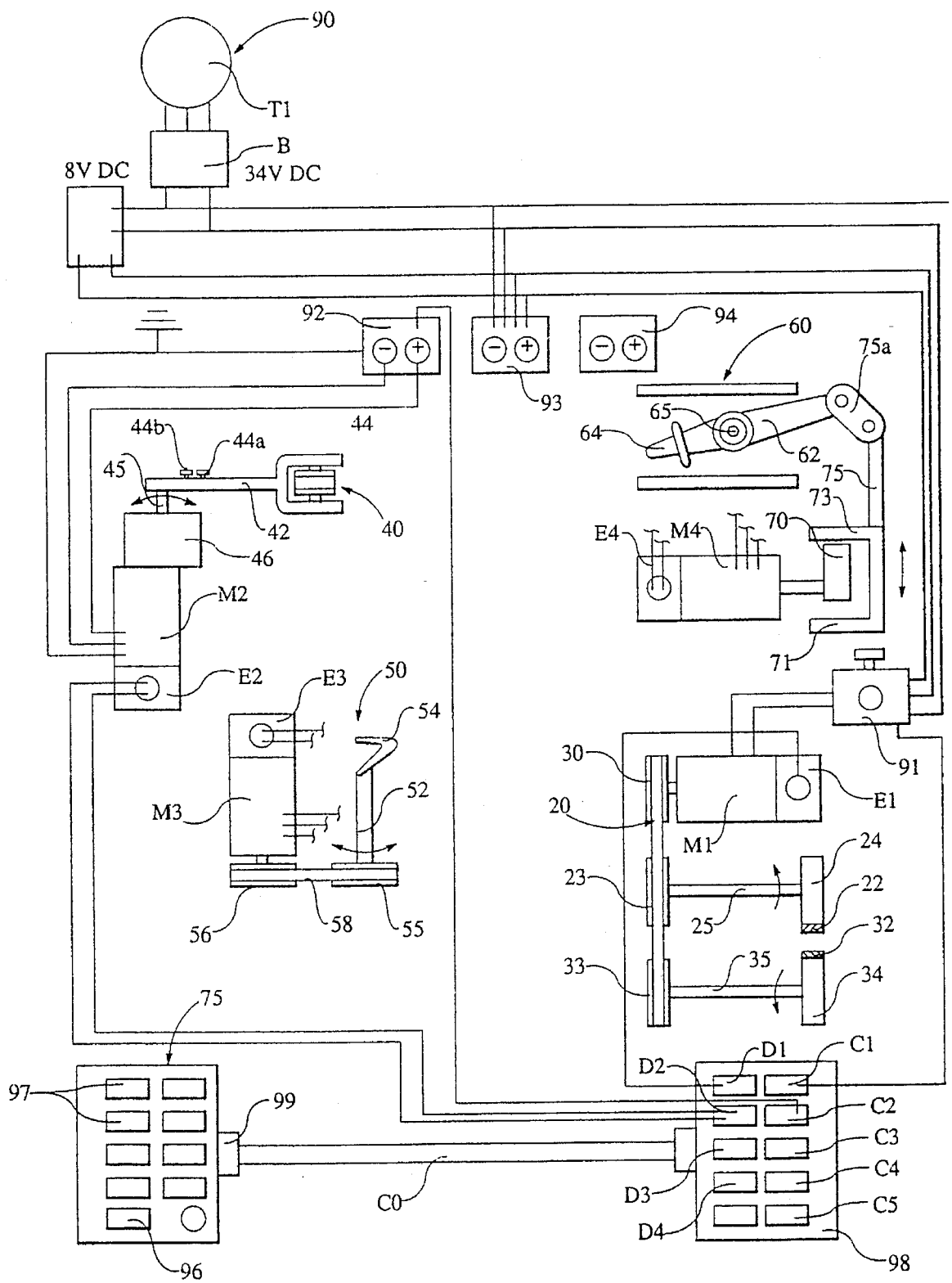
FIG. 7 is a wiring diagram of the closed loop microcomputer controlled control system.
Figure 10:
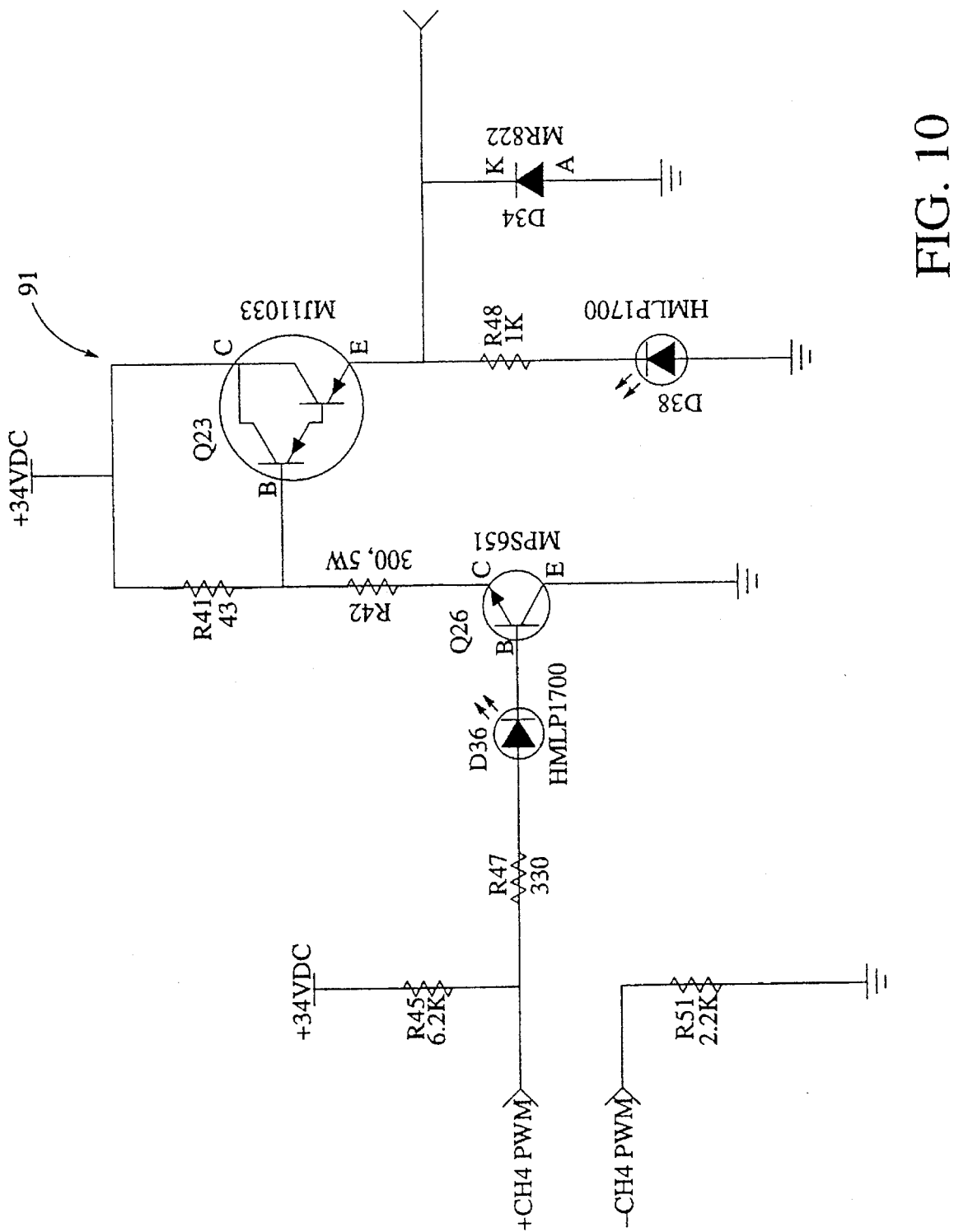
FIG. 10 is a schematic diagram of a single direction DC motor controller.

As illustrated in FIGS. 7 and 10 of the drawing, motor M1 is driven by a solid state DC motor controller 91 which is capable of varying the speed of motor M1 to substantially synchronize movement of upper gathering belt 22 and lowering gathering belt 33 with the speed of a conveyor 300 moving packages 125 adjacent the bag gathering mechanism 20. For example, if the tier 10 is to gather and tie the necks of 100 bags per minute, the conveyer 300 would preferably bring bags to and through the tier at a speed of approximately 300 feet per minute and the gathering belts 22 and 32 would preferably be driven at a speed of, for example 305 feet per minute, so that the neck of the bag would be accelerated for gathering the neck, stopped momentarily while it is being tied with a ribbon and then discharged in a substantially continuous operation.

As will hereinafter be more fully explained, the gathering assembly 20 also includes a bag stop lever 80, illustrated in FIGS. 2 and 3, mounted on shaft 85 for rotary movement about a horizontal axis, in the illustrated embodiment. Shaft 85 extends through an electric brake 82, which momentarily locks lever 80 in a lowered position extending across path 12 such that gathering belts 22 and 32 move the bag neck into engagement with lever 80. After the bag neck has been gathered and tied, the electric brake 82 is released and the gathered neck, carried between belts 22 and 32, urges the lever 80 upwardly such that it does not obstruct movement of the gathered neck. After the gathered neck passes lever 80, the lever 80 moves back to the illustrated position extending across path 12.

A needle assembly 40, best illustrated in FIGS. 1–4 and 7, is positioned for wrapping a strand 15 of ribbon material around a gathered neck of a bag. The needle assembly 40 comprises a needle 42 carrying idler rollers 44, 44a and 44b. The needle 42 is mounted on the output shaft 45 of a gear box 46 driven by motor M2. Needle 42 is shown in its home position in FIGS. 1 and 2 of the drawing. Motor M2 moves needle 42 from the full outline position to the dashed outline position, illustrated in FIG. 2 of the drawing, and then reverses for moving the needle 42 back to the position illustrated in full outline in FIG. 2.

Referring to FIGS. 1, 3 and 7 of the drawing, a twister hook assembly 50 comprises a twister shaft 52 rotatably mounted in a bearing 53 having a hook 54 on one end thereof and a pulley 55 on the other end. A drive pulley 56 is mounted on the drive shaft of motor M3 and drives pulley 55 through a belt 58.

As best illustrated in FIGS. 1, 2, 5, 7 and 14 of the drawing, a ribbon holder-shear assembly, generally designated by the numeral 60, comprises a holder and shear assembly of the type disclosed in Design U.S. Pat. No. 307,281 to Charles E. Burford and U.S. Pat. No. 4,856,258 entitled WIRE TYING DEVICE, which issued Aug. 15, 1989, to Charles E. Burford and Jimmy R. Frazier. The holder-shear assembly 60 comprises a gripper arm 62 having a gripper finger 64 on one end thereof rotatably secured to a mounting plate 66 by bolt 65. A pair of anvils 68 and 69 are formed on the end of mounting plate 66, each being associated with shear surfaces 68a and 69a to grip and cut a strand of ribbon as will be hereinafter more fully explained.

Referring to FIGS. 5 and 7 of the drawing, a cam 70 is mounted on the shaft of motor M4 and is configured to engage cam-followers 72 and 74 on spaced arms 71 and 73 secured to and actuating rod 75 mounted for reciprocating movement in bearings 76. A link 75a secures the end of gripper arm 62 to actuating rod 75.

It should be readily apparent when the shaft of motor M4 rotates one-half revolution, cam 70 will exert force through cam-followers 72 and 74 for moving actuating rod 75 for pivoting the actuating arm 62 about bolt 65. The free end of the ribbon is gripped between the end of gripper finger 64 and anvil 68 or 69, depending on which direction the gripper finger 64 is shifted. As will be hereinafter more fully explained, when needle 42 wraps the intermediate section of the ribbon 15 around the gathered neck of a bag, the ribbon will be positioned between gripper finger 64 and the other anvil 68 or 69. When gripper finger 64 is shifted to its opposite position, the ribbon will be cut and the free end of the strand of ribbon will be gripped between gripper finger 64 and anvil 68 or 69.

Figure 13:
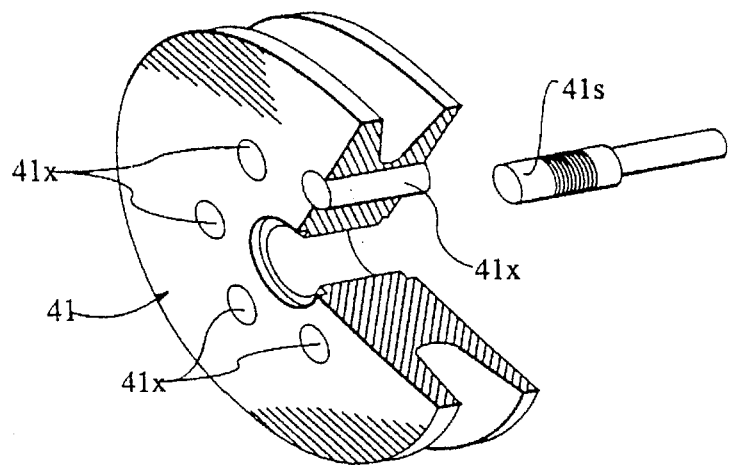
FIG. 13 is a diafframatic perspective view of a pulley and proximity switch.

Referring to FIGS. 12 and 13 of the drawing, roller 41 has a plurality of index points 41x. In the illustrated embodiment, the index points are formed by steel dowel pins circumferentially spaced around the axis about which roller 41 rotates.

A proximity switch 41s is positioned near index pointers 41x for making an electrical circuit when the presence of an indexing pin 41x is sensed. The proximity switch 41s is of conventional design and is connected through a suitable power supply and amplifier to the CPU 96.

Thus, the CPU monitors the proximity output and counts the pulses produced by index pins 41x in roller 41. The CPU 96 calculates the amount of ribbon dispensed to determine whether or not a bag neck is present as needle 42 moves from the full outline position illustrated in FIG. 2 of the drawing toward the dashed outline position illustrated in FIG. 2 of the drawing. If needle 42 did not wrap ribbon around a bag neck, the CPU will terminate a portion of the remainder of the cycle of operation so that holder-shear 65 will not be actuated to prevent releasing the end of ribbon 15 which is gripped between gripper finger 64 and anvil 68 or 69.

Referring to FIGS. 1, 2 and 3 of the drawing, a bag stop lever 80 is mounted on a shaft 85 for rotary movement about a horizontal axis. Shaft 85 extends through an electric brake 82 and has a crank arm 85a secured thereto which is resiliently urged in a clockwise direction, as viewed in FIG. 3, by a spring 83.

A switch 86 is actuated by switch arm 88, which actuates a timer for energizing electric brake 82 which momentarily locks bag stop 80 in a fixed position for a predetermined period of time, for example 0.25 seconds for restraining the leading edge of a bag neck, such that gathering belts 22 and 32 will gather the neck adjacent bag stop 80. At the expiration of the predetermined period of time, electric brake 82 will be de-energized so that linear movement of the bag neck will rotate bag stop 80 upwardly to release the bag so that it will be moved away by the conveyor. Bag stop 80 is biased toward the position illustrated in FIG. 3 of the drawing by a spring 83. It should be readily apparent that the spring 83 may be replaced by a counter-weight, air cylinder or other suitable biasing mechanism to resiliently urge bag stop 80 toward its home position.

Motors M1, M2, M3 and M4 are bi-directional, permanent magnet, DC brush-type servomotors having outputs proportional to the voltage applied across the armatures. Such motors are commercially available from Groschopp, Inc. of Sioux Center, Iowa as a "Power Master 8304" 24 volt DC continuous power motor. At 1500 rpm the motor generates 16 oz-in torque and has an output of 0.090 horsepower at 4.2 amps. At 2450 rpm the torque is 47 oz-in and the output is 0.113 horsepower at 5 amps. At 5400 rpm the torque is 37 oz-in and the output is 0.197 horsepower at 8.2 amps.

It is noted that other motors and motors of other sizes may be provided to facilitate driving the various assemblies. For example, it is contemplated that smaller motors would be used in a counter top model used for gathering and fastening materials such as coils of electrical cord, water hose, tubing, or yarn, and bundles of cable, rods, or carrots and other produce.

One side of the armature winding of each motor M1, M2, M3 and M4 is connected to ground such that reversing the polarity of current through the armature winding reverses the direction of rotation of the motor.

Each of the motors M1, M2, M3 and M4 has an encoder E1, E2, E3 or E4 mounted on its drive shaft which delivers an electrical signal to a decoder D1, D2, D3 or D4 which is representative of the position of the motor shaft.

MOTOR CONTROLLER

Figure 8:
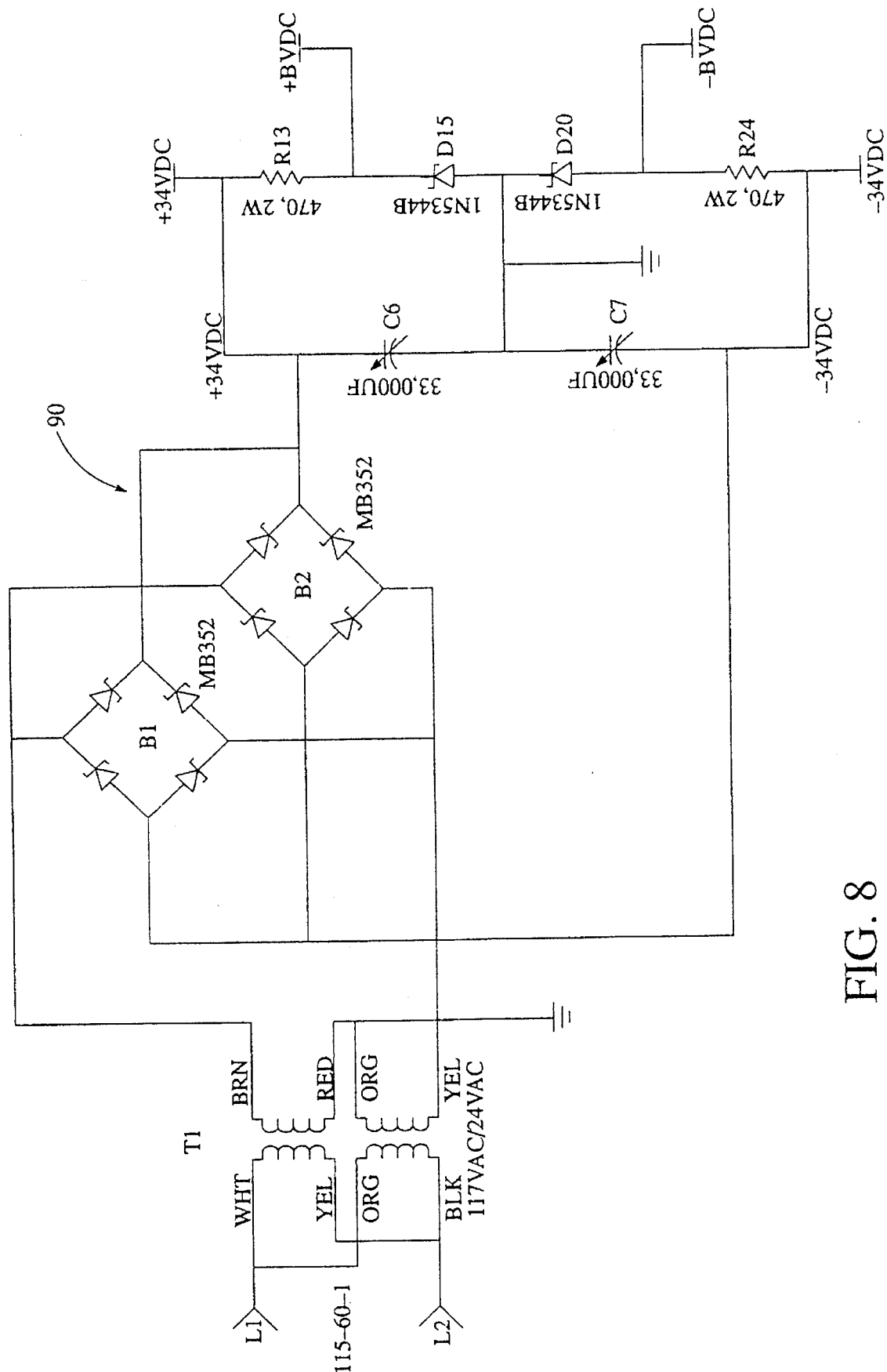
FIG. 8 is a schematic diagram of the full wave rectified 8 and 34 volt power supply.

Referring to FIGS. 7 and 8 of the drawing, the numeral 90 generally designates a power supply for delivering electric current to motor controller 91 and to motor M1 in the bag neck gathering mechanism 20; motor controller 92 and motor M2 in the needle assembly 40; motor controller 93 and motor M3 in the twister assembly 50; and motor controller 94 and motor M4 in the holder-shear assembly 60. Referring to FIG. 8 of the drawing, the power supply 90 comprises a pair of single-phase, doughnut transformers T1 connected in parallel. The supply or primary circuits of transformers T1 are connectable to any suitable source of electricity such as 115 volt, 60 cycle, single-phase electricity. The energy receiving or secondary circuits of transformers T1 are connected through one or more rectifier bridge circuits B1 and B2 and capacitors C6 and C7 to a pair of controlled voltage power terminals, one of which forms a source of direct current maintained at positive 34 volts and the other a source of direct current at negative 34 volts.

An eight volt direct current power supply is illustrated in FIG. 8 of the drawing. The eight volt power supply comprises a pair of terminals connectable to the positive and negative 34 volt terminals of power supply 90 through resistors R13 and R24 to positive and negative 8 volt terminals. A pair of diodes Zenier D15 and D20 are provided in the 8 volt power supply between resistors R13 and R24 and a ground terminal.

The rectifiers in bridge circuits B1 and B2 are conventional MB 352 rectifiers. Capacitors C6 and C7 are, for example 33,000 UF capacitors. Resistors R13 and R24 are 470 ohm, 2 watt resistors.

The 34 volt and 8 volt power supplies illustrated in FIGS. 7 and 8 are of conventional design and form no part of the present invention except in combination with the other elements of the control circuit. It should be appreciated that many other DC power supplies may be used in lieu of those illustrated in the drawing.

ENCODERS

Conventional multichannel incremental optical encoders E1, E2, E3 and E4 are mounted on the shaft of each motor M1, M2, M3 and M4, respectively. The encoders E1–E4 are high resolution incremental optical devices which include an encoder body, a metal code wheel and emitter end plate. An LED source and lenses transmit collimated light from the emitter diode through a precision metal code wheel and phase plate into a bifurcated detector lens (not shown).

The light is focused onto pairs of closely spaced integrated detectors which output two square wave signals in quadrature and an optional index pulse.

HEDS-6000 series, two and three channel incremental optical encoder kits are available from Hewlett Packard of Palo Alto, Calif. A standard selection of shaft sizes and resolutions between 192 and 1024 cycles per shaft revolution are available. The part number for a standard two-channel encoder is HDS-6000, while that for the three-channel device, with index pulse, is HEDS-6010. The encoder devices are typically used for printers, plotters, tape drives, positioning tables, automatic handlers, robots, and other servo loop applications. Specific details of construction of the incremental optical encoder can be found in Hewlett Packard Publication No. 5954-8420 (3/87) which is incorporated herein by reference.

The incremental shaft encoder operates by translating the rotation of a shaft into interruptions of a light beam which are then output as electrical pulses. The light source is a light emitting diode collimated by a molded lens into a beam of parallel light. An emitter end plate contains two or three similar light sources, one for each channel.

The code wheel is a metal disc that has N equally spaced slits around its circumference. An aperture with a matching pattern is positioned on a stationary phase plate. The light beam is transmitted only when the slits in the code wheel and the aperture line up; therefore, during a complete shaft revolution, there will be N alternating light and dark periods. A molded lens beneath the phase plate aperture collects the modulated light into a silicon detector.

The encoder body contains the phase plate and the detection elements for two or three channels. Each channel consists of an integrated circuit with two photo-diodes and amplifiers, comparator, and output circuitry (not shown).

The apertures for the two photo-diodes are positioned so that a light period on one detector corresponds to a dark period on the other. The photo-diode signals are amplified and fed to a comparator whose output changes state when the difference of the two photo currents changes sign. The second channel has a similar configuration but the location of its aperture pair provides an output which is in quadrature to the first channel (phase difference of 90°). Direction of rotation is determined by observing which of the channels is the leading waveform. The outputs are TFL logic level signals.

The motion sensing application and encoder interface circuitry will determine the need for relating the index pulse to the main data tracks. A unique shaft position is identified by using the index pulse output only or by logically relating the index pulse A and B data channels. The index pulse can be uniquely related to the A and B data tracks in a variety of ways. Statewidth, pulse width or edge transitions can be used.

The two square wave signals in quadrature of channels A and B and a 5 volt supply input are delivered through a 10-pin connector to a corresponding decoder D1, D2, D3 or D4 mounted on an auxiliary board, as illustrated in FIG. 7 of the drawing. Lines connecting encoders E2 to a decoder D2 are illustrated. Encoders E3 and E4 are similarly connected to decoders D3 and D4.

DECODERS

Quadrature decoders D1–D4 are CMOS (complimentary metal-oxide semiconductor) integrated circuits that perform the quadrature decoder, counter, and bus interface functions. "HTCL-2000," commercially available from Hewlett Packard, quadrature decoder/counter interface IC decoder interfaces an encoder to a microprocessor and is designed for use in digital closed loop motion control systems and digital data input systems.

The decoder includes a 4X quadrature decoder, a binary up/down state counter and a 16-bit bus interface. A Schmitt-triggered CMOS input and input noise filters are incorporated in the device.

Further information regarding the quadrature decoder/counter interface IC for interfacing to Motorola and Intel microprocessors can be found at page 1–61 through page 1–76 of Hewlett Packard Publication for "HCTL-2000," "HCTL2016," "HCTL-2020."

Decoders D1–D4 have pins for a channel A and channel B Schmitt-trigger inputs which accept the outputs from quadrature encoders E1–E4. The two channels are preferably 90° out of phase.

CONTROLLER

The system is controlled by a computer 95, illustrated in FIG. 7, which receives and stores a set of instructions and then acts upon the instructions in a predetermined and predictable fashion. A microprocessor 96 is attached to a printed circuit board into which a thin layer of metal has been applied and then etched away to form traces. The electronic components of the central processing unit are attached to the board with solder so that they can change electronic signals through the etched traces on the board.

A suitable 32-bit integrated microcontroller 96 is the MC68332 which is commercially available from Motorola, Inc. of Schaumburg, Ill. as a product referred to as "MC68332 SIM" System Integrated Module. A complete documentation package of the MC68332 consists of the (SIM 32UM/AD), MC68332 *System Integration Module User's Manual,* the (CPU32RM/AD), *CPU32 Reference Manual,* and the (TPU32RM/AD), *Time Processing Unit Reference Manual.* The *MC68332 System Integration Module User's Manual* describes the capabilities, registers, and operation of the MC68332 MCU. The *CPU Reference Manual* describes the operation, programming and instruction set of the CPU32 processor used in the MC68332. The *Time Processing Unit Reference Manual* describes the autonomous timer system used in the MC68332.

The MC68332 microcontroller 96 contains intelligent peripheral modules such as the time processor unit (TPU) which provides 16 microcoded channels for performing time-related activities for simple input capture or output capture to complicated motor control or pulse width modulation. High-speed serial communications are provided by the queued serial module (QSM) with synchronous and asynchronous protocols available. Two kilobytes of fully static standby RAM allow fast two-cycle access for system and data stacks and variable storage with provision for battery backup. Twelve chip selects enhance system integration for fast external memory or peripheral access. These modules are connected on-chip via an intermodule bus (IMB).

The Mc68332 microcontroller 96 is a 132-pin plastic quad fiat pack that operates at a frequency of 16.78 MHz with a 5 volt supply and is software programmable. It has 16 independent programmable channels and pins. Any channel can perform any time function including input capture, output compare or pulse width modulation (PWM).

The detailed logical procedures or algorithms processed by the microcomputer are proportional integral derivative (PID) type control mode signals. The PID control mode combines the best action of proportional control, integral control and derivative control in a dosed loop control system.

In addition to the microcontroller chip 96 on the CPU board, random-access memory (RAM) integrated circuits 97 are used for storing values in distinct locations which can be recalled or altered for storing the software which controls the system. Since the values which are in RAM memory are lost when the power of the computer is turned off, a battery backup is provided. The microcontroller 96 processes digital signals, such as the presence or absence of voltages, to represent values.

The CPU board is connected to an auxiliary board 98 through a connector header which carries data signals and address signals. Driver circuits C1–C4, which generate pulse width modulated (PWM) signals, are mounted on the auxiliary board along with the decoders D1–D4. The pulse width modulated signals from driver circuits C1–C4 are sent to the motor drivers 91–94 selectively delivering positive or negative DC power to control the operation of motors M1–M4.

CLOSED LOOP

The circuits carrying input signals from the encoders E1–EA to decoders D1–D4; the circuit carrying pulse width modulated signals from driver circuits C1–C4 to motor drivers 91–94; and the circuits carrying power from the motor drivers 91–94 to motors M1–M4 form a closed loop control system. The closed loop control system depends upon the feedback concept for operation and the output PWM signals are forced to a pre-assigned function of the reference input of the microcontroller of the central processing unit. The microcontroller 96 sends control PWM signals determined by the programmed movements stored in RAM memory in a pre-assigned order as a function of time after switch arm 88 returns to its home position illustrated in FIG. 3. The control PWM signals are delivered to the control circuit. Each encoder E1–E4, connected to the shaft of motors M1–M4, send quadrature signals to the decoders D1–D4 that indicate the position of the shaft of each motor. The control PWM signals delivered to each control circuit C1–C4 are delivered to motor drivers 91–94. The quadrature signals from decoders D1–D4 are read to adjust the control PWM signals.

Drivers 92, 93 and 94, which control the delivery of power to motors M2, M3 and M4, respectively, for controlling the needle assembly 40, twister hook assembly 50 and holder-shear mechanism 60 are substantially identical. One side of the winding of each of the motors M2, M3 and M4 is connected to ground. Drivers 92, 93 and 94 deliver either positive or negative power to the other side of the motor winding for drying motors M2, M3 and M4 in opposite directions. For example, when positive 34 volt direct current is delivered to the winding of motor M2, its shaft is driven in a clockwise direction. If negative 34 volt direct current is delivered to the winding of motor M2, its shaft will be driven in a counter-clockwise direction.

The driver 91 for motor M1 connected to the bag gathering assembly 20, is similar to drivers 92, 93 and 94 except that driver 91 is not provided with the capability of delivering negative direct current because it is not necessary for motor M1 to be driven in reverse.

Figure 11:
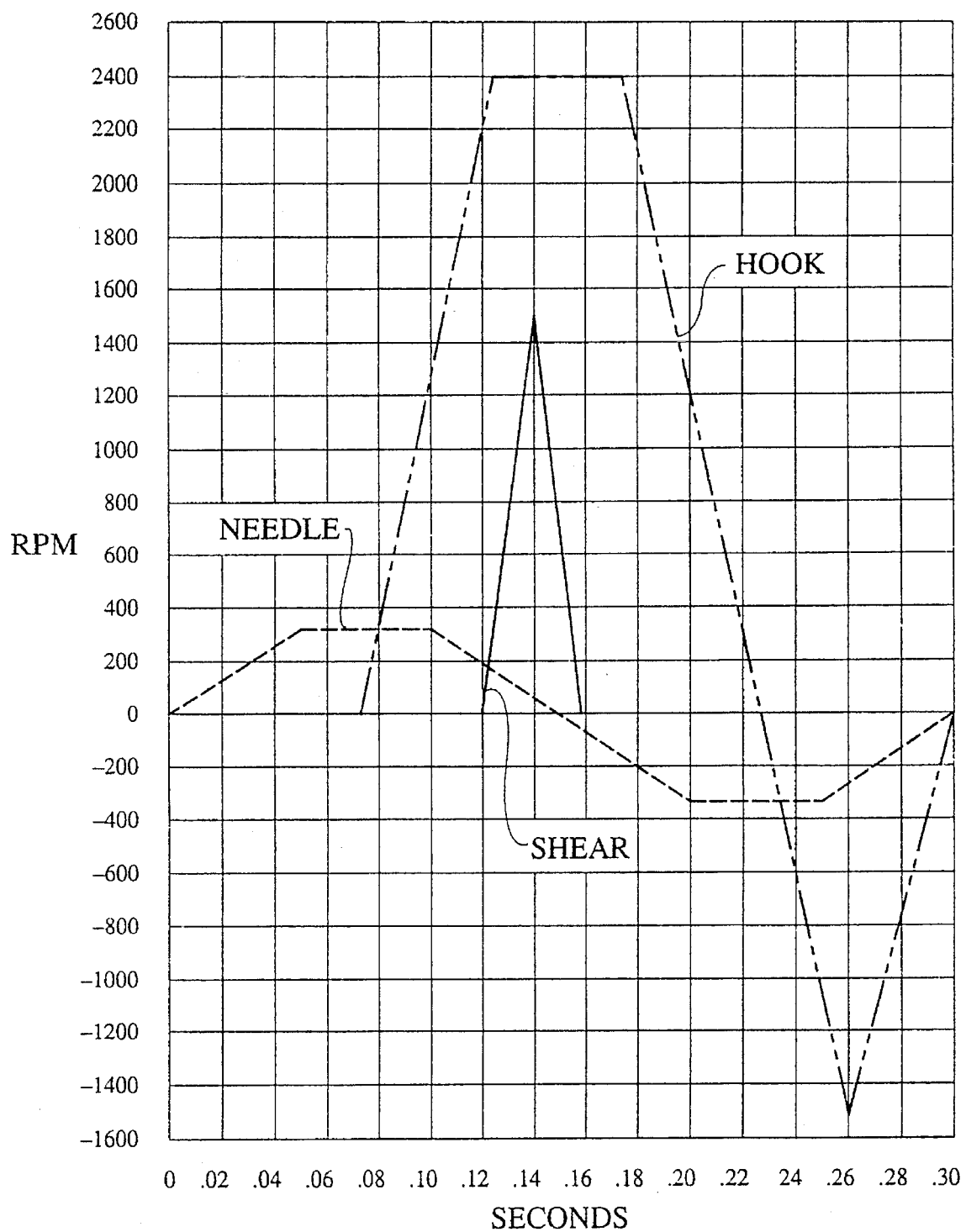
FIG. 11 is a graphic representation of the sequence of operation of the needle, hook and shear assemblies during a complete cycle of operation.

Software is stored in FEEPROM memory on the CPU board for controlling the acceleration, speed and position of the shaft of each motor M1–M4. FIG. 11 is a graphic representation of the sequence of operation of the needle, hook and shear assemblies during a complete cycle of operation. The microcontroller 96 is initially programmed by a computer through a serial port RS for storing a program which will initiate movement of needle 42 from its home position illustrated in FIG. 3 and the speed of movement toward the dashed outline position illustrated in FIG. 3 controlled by signals delivered through control circuit C2 to motor M2. While needle 42 is moving from the position illustrated in full outline toward the position illustrated in dashed outline, the program causes a signal to be sent from control circuit C3 to motor M3 to begin rotating twister hook 54 and continue rotation of twister 54 a predetermined number of revolutions controlled by the motion profile in RAM memory. Similarly, when needle 42 and twister hook 54 are in predetermined positions, a signal will be sent from driver circuit C4 which will energize motor M4 for rotating cam 70 to move the gripper finger 64 to release the free end of the ribbon and shear a segment from the end of the strand of ribbon. At a time controlled by the software, a signal will be delivered to motor M2 for moving needle 42 from the position shown in dashed outline in FIG. 3 back to its home position. A signal will be delivered to motor M3 for rotating twister hook 54 two revolutions in the reverse direction for slinging the tie, which has been twisted around the neck of a bag, out of the twister hook 54 for completing a tying cycle.

It should be readily apparent that when the neck of a bag moves between gathering belts 22 and 32, switch arm 88 will be moved downwardly from the position illustrated in FIG. 3 which will energize electric brake 82 so that belts 22 and 32 will move the neck of the bag into engagement with bag stop 80 causing the neck to be gathered. As the trailing edge of the neck of the bag passes over the end of switch arm 88, switch arm 88 will move back to the position illustrated in FIG. 3 causing switch 86 to send a signal to the microcontroller for starting a new tying cycle.

Figure 9:
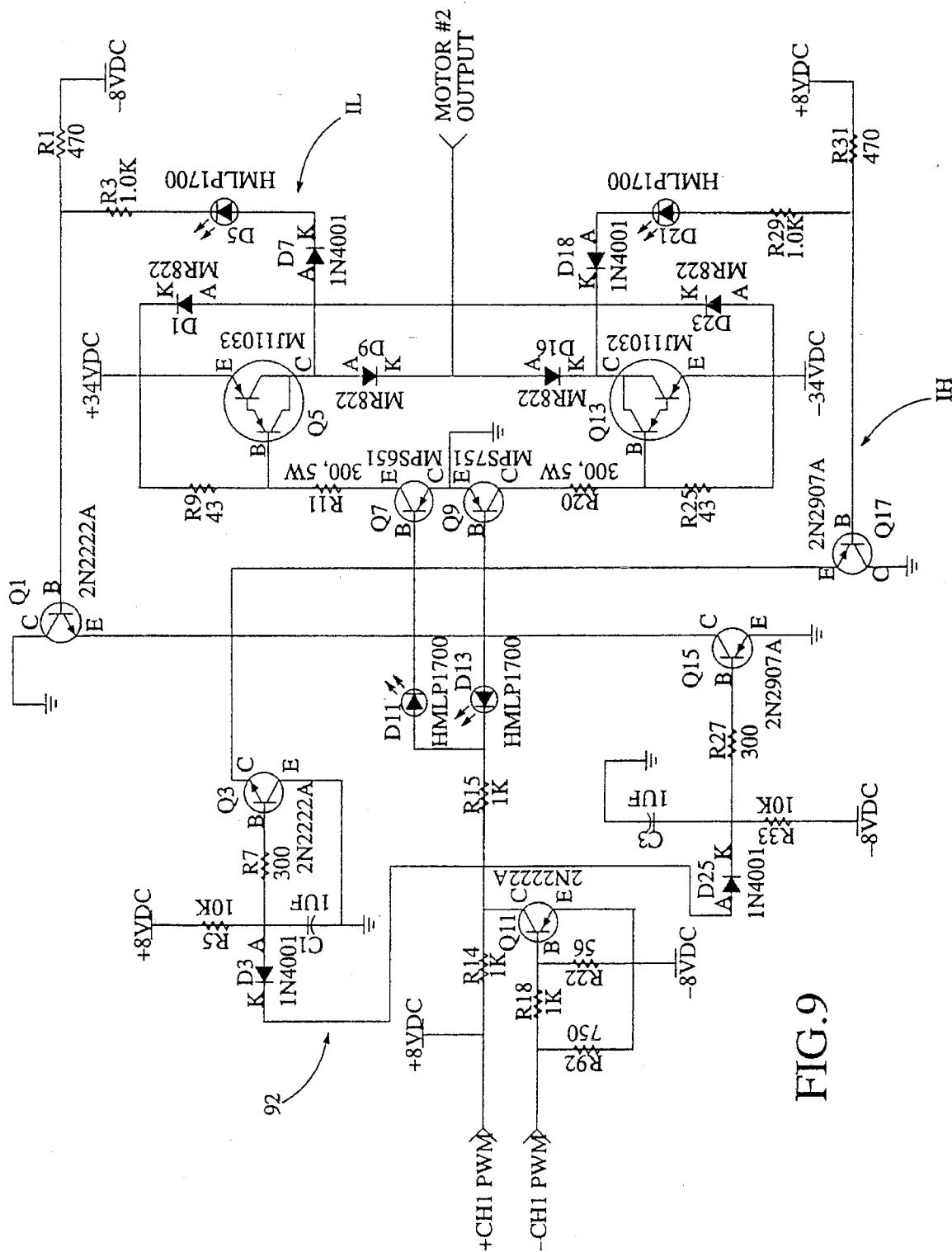
FIG. 9 is a schematic diagram of a bi-directional DC motor controller.

A schematic diagram of a motor controller 92 is illustrated in FIG. 9 of the drawing. The optic coupler C0 delivers a PWM signal to the positive terminal CH1 from driver circuit C2 with reference to the negative terminal CH1.

The positive terminal CH1 is connected through resistor R14, resistor R15 and diode D11 to the base terminal of high rail MPS651 transistor Q7. The negative terminal CH1 is connected through resistor R18 to the base of 2N2222A transistor Q11 and through a 750 ohm resistor R92 to a negative 8 volt terminal and to the emitter of transistor Q11. A 56 ohm resistor R22 forms a shunt between the base and emitter of transistor Q11. The collector of transistor Q11 is connected between resistors R14 and R15.

The 1 ohm resistor R15 is connected through HMLP1700 diode D13 to the base of low rail MPS751 transistor Q9.

Transistor Q11 turns off and on to turn transistors Q7 and Q9 off and on, which in turn, turn the high rail MJ11033 power transistor Q5 and the low rail MJ11032 power transistor Q13 off and on.

The collector of high rail transistor Q7 is connected through a 300 ohm 5 watt resistor R11 to the base of high rail power transistor Q5. The emitter of high rail transistor Q5 is connected to a +34 volt DC terminal while the collector of power transistor Q5 is connected through an MR822 diode D9 to a line connected to one side of the winding of motor M2. The collector of low rail transistor Q9 is connected through a 300 ohm 5 watt resistor R20 to the base of low rail power transistor Q13. The emitter of low rail power transistor Q13 is connected to a −34 volt DC terminal while its collector is connected through MR822 diode D16 to the line connected to one side of the winding of motor M2.

When the PWM signal, delivered to the terminals marked CH1 is not conducting current, high rail transistor Q7 and high rail power transistor Q5 are turned on for delivering a positive 34 volt direct current to the motor winding causing motor M2 to tend to move in a clockwise direction. When the PWM signal, delivered to the terminals marked CH1, are conducting current, low rail transistor Q9 and low rail power transistor Q13 are turned on for delivering a negative 34 volt direct current to the motor winding causing motor M2 to tend to move in a counter-clockwise direction. The ratio of time in which the PWM signal is in either state determines the direction and speed of the motor.

To protect high rail power transistor Q5 and low rail power transistor Q13 from being conducting air the same time due to differences in manufactured component switching times, high rail inhibit transistor Q17 disables high rail transistor Q7 from turning on as long as low rail power transistor Q13 is turned on.

Likewise low rail inhibit transistor Q1 inhibits low rail transistor Q9 from turning on if there is a positive voltage at the collector of high rail power transistor Q5 sufficient to forward bias low rail inhibit transistor Q1.

The high rail inhibit circuit IH is connected from the collector of the low rail power transistor through diodes D18 and D21 and resistor R29 to the base of high rail inhibit transistor Q17. The emitter of high rail inhibit transistor Q17 is connected to the base of high rail transistor Q7. The low rail inhibit circuit IL is connected from the collector high rail power transistor Q5 through diodes D7 and D5 and resistor R3 to the base of low rail inhibit transistor Q1. The emitter of low rail inhibit transistor Q1 is connected to the base of low rail transistor Q9.

The low rail and high rail inhibit circuits IH and IL assure that the control output voltage be zero before switching occurs. The inhibit circuits protect the power transistors Q5 and Q13.

It is to be understood that while detailed descriptions of a preferred embodiment has been illustrated and described, the invention is not to be limited to the specific arrangement of parts and specific features herein described and illustrated in the drawing. Rather, the descriptions are merely of an exemplary embodiment of the invention, which may be embodied in various forms.

Having described the invention, we claim:

1. Bag neck tying apparatus comprising:

a pulley having index points;

a proximity switch mounted adjacent said pulley to indicate movement of said index points on said pulley;

a source of ribbon for dispensing a strand of ribbon having a free end and a central portion, said central portion of ribbon extending around said pulley;

a holder-shear assembly for holding the free end of said ribbon;

a needle assembly for engaging and positioning said central portion of said ribbon adjacent said holder-shear assembly;

a twister assembly having a hook adjacent said holder-shear assembly;

an electric motor having a drive shaft connected for actuating said holder-shear assembly; and a control circuit connected to said proximity switch and said motor for controlling movement of said holder-shear assembly, said control circuit being configured to prevent movement of said holder-shear assembly if movement of index points on said pulley do not indicate that a sufficient amount of ribbon has been dispensed from said source of ribbon.

2. Bag neck tying apparatus according to claim 1, with the addition of:

an encoder connected to said drive shaft for generating electrical signals related to the position of said drive shaft, said control circuit comprising a closed loop control circuit connected to said motor and said encoder;

a CPU having programmable read only memory and random access memory; and software stored in said memory for generating a reference input signal for controlling said motor.

3. Bag neck tying apparatus according to claim 2, said closed loop control circuit comprising:

a feedback loop for forcing said reference input signal to a predetermined value which is a function of the position of said shaft.

4. Bag neck tying apparatus according to claim 2, said encoder comprising:

a light source;

a code wheel having slits formed therein; and a lens to focus and transmit collimated light from said light source through slits in said code wheel to deliver at least two square wave signals in quadrature.

5. Bag neck tying apparatus according to claim 2, said electric motor comprising:

a bi-directional, permanent magnet, DC brush-type servomotor having an armature and a drive shaft, said drive shaft having output power that is proportional to the voltage applied across the armature.

6. Bag neck tying apparatus according to claim 1, said twister assembly comprising:
- a twister shaft;
- a hook on said twister shaft; and
- means connecting said drive shaft of said motor to said twister shaft.

7. Bag neck tying apparatus according to claim 1, said needle assembly comprising:
- a needle;
- an idler roller on said needle; and
- a gearbox drivingly connecting said needle to said motor output shaft.

8. Bag neck tying apparatus according to claim 1, said holder-shear assembly comprising:
- a mounting plate;
- a gripper arm;
- a gripper finger on one end of said gripper arm;
- means for rotatably securing said arm to said mounting plate; and
- a pair of anvils on said mounting plate, each of said anvils being associated with shear surfaces to grip and cut a strand of ribbon positioned between one of said anvils and said gripper finger.

9. Bag neck tying apparatus according to claim 1, with the addition of:
- a bag gathering assembly for gathering material moving toward said ribbon of tie material to form a gathered bag neck, said gathering assembly being positioned adjacent said holder-shear assembly.

10. Bag neck tying apparatus according to claim 9, said material gathering assembly comprising:
- a bag stop lever mounted on a shaft for rotary movement about an axis;
- a brake for momentarily locking said lever in a position extending across a path such that the bag neck moves into engagement with said lever for gathering material moving toward said ribbon of tie material.

* * * * *

UNITED STATES PATENT AND TRADEMARK OFFICE
CERTIFICATE OF CORRECTION

PATENT NO. : 5,483,134

DATED : January 9, 1996

INVENTOR(S) : Jimmy R. Frazier, John D. Richardson & Greg P. Coxsey

It is certified that error appears in the above-indentified patent and that said Letters Patent is hereby corrected as shown below:

Column 1, line 16, change "Charles C. Burford" to read --Charles E. Burford--.

Column 1, line 48, delete the colon between the words "separate" and "subassemblies".

Column 2, line 34, change "diafframatic" to read --diagrammatic--.

Column 2, line 37, change "diafframatic" to read --diagrammatic--.

Column 2, line 60, change "Figure I" to read --Figure 1--.

Column 3, line 28, change "herein;after" to read --hereinafter--.

Column 4, line 3, change "2.8" to read --28--.

Column 4, line 34, change "parks" to read --parts--.

Column 5, line 34, change "and" to read --an--.

Column 8, line 15, change "TFL" to read --TTL--.

Column 8, line 52, change ""HCTL2016"" to read --"HCTL-2016"--.

Column 9, line 40, change "dosed" to read --closed--.

Column 9, line 63, change "E1-EA" to read --E1-E4--.

UNITED STATES PATENT AND TRADEMARK OFFICE
CERTIFICATE OF CORRECTION

PATENT NO. : 5,483,134

DATED : January 9, 1996

INVENTOR(S) : Jimmy R. Frazier, John D. Richardson & Greg P. Coxsey

It is certified that error appears in the above-indentified patent and that said Letters Patent is hereby corrected as shown below:

Column 10, line 22, change "drying" to read --driving--.

Column 11, line 50, change "air" to read --at--.

Signed and Sealed this

Ninth Day of July, 1996

Attest:

BRUCE LEHMAN

Attesting Officer

Commissioner of Patents and Trademarks